Oct. 9, 1956
M. A. HASSID ET AL
EXPANDABLE STOPPERS
Filed June 8, 1954
2,765,945
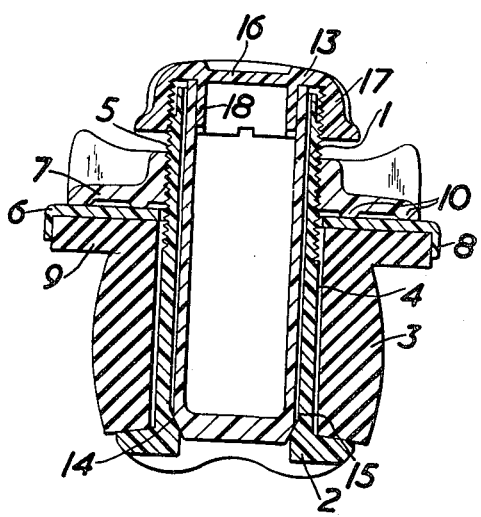
INVENTORS
MAURICE ALBERT HASSID
ERNEST VENIS
BY *Frederick E. Hause*
ATTORNEY United States Patent Office 2,765,945
Patented Oct. 9, 1956

2,765,945

EXPANDABLE STOPPERS

Maurice Albert Hassid, London, and Ernest Venis, Hatch End, England, assignors to The British Vacuum Flask Company Limited, London, England Application June 8, 1954, Serial No. 435,225

Claims priority, application Great Britain June 9, 1953

2 Claims. (Cl. 215—54)

This invention relates to expandable stoppers such as are used as closures for vacuum flasks and the like, and has reference to the type of stopper provided with an expandable element which after insertion into the neck or orifice of a flask or jar is compressed axially to expand it radially so as to make a tight circumferential fit.

The primary object of the present invention is to provide a stopper of this general type which will facilitate the pouring out of the contents of a lipless container such as a vacuum flask without sacrificing any of the advantages of the expanding stopper.

According to the invention there is provided a bottle or like stopper comprising a resilient stopper element through which extends a hollow column, and which is adapted when longitudinally compressed by means on the column to expand radially, closure means being provided for the hollow column.

In order that the invention may be well understood we will now describe one embodiment thereof with reference to the accompanying drawing which comprises a longitudinal section of a stopper. A stopper in its entirely according to the invention consists of a central hollow column 1 preferably constituted by a nylon moulding. The lower end of this column is outwardly flanged as at 2 and an expandable sealing element 3 of the stopper is seated on this flange serrations preferably being provided on the flange 2 to prevent any relative rotation between the flange and element 3 and it is important when the stopper is to be used for closing a vacuum flask that an annular space 4 to provide air insulation is left between the inner wall of the expanding element and the wall of the hollow column 1. The upper end of this column is provided with an external screw thread 5 and a loose flanged disc 6, for co-operation with a rotatable operative knob 7, is slipped over the upper screw-threaded end of the hollow column. This disc may be of nylon and has a downwardly directed flange 8 which embraces a washer 9 integral with the expandable element or which may be of resilient material resting on the top of the expandable element. The rotatable operating knob 7 consists of a moulding of suitable material, has a pair of annular ridges 10 on its underside which rest on the non-rotatable nylon disc aforesaid, and is screw threaded on to the column 1. It will be understood that the screwing down of the knob along the hollow column will cause the non-rotatable nylon disc to move down axially and compress the resilient expandable sealing element so as to cause it to expand and make a tight fit all in the flask neck, and the resilient flange or disc hereinbefore mentioned will overlie the rim of the vacuum flask and will be simultaneously pressed into sealing contact with it.

The stopper as heretofore described has a central pouring tube. To complete the stopper and provide an airtight closure this central tube is closed by a hollow plug or removable secondary stopper 13. It can be preferably filled with heat insulating material such as granulated cork, asbestos fibre, glass, wool or any other known heat insulation. It is closed at the bottom and has a conical end surface 14 which seats upon a conical seating 15 formed on the interior of the bottom end of the hollow central column.

The open top end is closed by a disc or cap 16 which could carry a medallion carrying a monogram or some other advertising matter and has a flange 18 to which the plug is secured. The disc is provided with a down-turned flange 17 the inner wall of which is screw threaded to engage the extreme screw-threaded end of the hollow column aforesaid so that it can be screwed down to cause its lower closed and coned end to make a sealed joint on the conical seating at the bottom end of the hollow column. There are obviously various ways in which this air-tight sealing can be effected. For example the conical seating could be replaced by screw threading and instead of the plug being forced down by screwing it could be just prised into position and forced down by the screwed outer cap which, in a vacuum flask is usually used to enclose the stopper as a whole. An annular air gap will preferably be arranged to separate the body of the plug from the inner wall of the hollow column to increase the air insulation as a whole.

We claim:

1. A stopper comprising a central hollow pouring column having external threads, an abutment carried by said column, a resilient element located in substantially parallel spaced relationship about said column and having one end in engagement with said abutment, a disc carried by the other end of said resilient element, a threaded ring engaging said external threads on said column and in abutment with said disc, a hollow closure having an outer extremity and an inner extremity defining a first air space therebetween, said inner extremity extending into and being spaced from the walls of said column and defining a second closed air space therebetween, and sealing means within said column disposed inwardly in a direction away from said disc at least as far as said abutment, said inner extremity of said closure being engaged with said sealing means to further define said second air space.

2. A stopper comprising a central hollow pouring column having external threads, an abutment extending outwardly of said column, a resilient element surrounding said column and being laterally spaced therefrom along its length, one longitudinal extremity of said element engaged with said abutment, a washer engaged with the opposite longitudinal extremity of said element, an internally threaded ring engaging said external threads of said column and being in compression inducing engagement with said washer on said element, a flange disposed within said column adjacent to said abutment, and a hollow closure defining an internal air space extending into said column and being threaded at one end thereto, the opposite end of said closure being in sealing engagement with said flange, said hollow closure being spaced from said column between said one threaded end engagement and said other sealing end engagement therewith and defining a closed airspace therebetween.

References Cited in the file of this patent

UNITED STATES PATENTS

| 607,285 | Scholz | July 12, 1898 |
| 820,469 | Bennett | May 15, 1906 |
| 2,245,887 | Wikander | June 17, 1941 |
| 2,292,726 | Trippensee | Aug. 11, 1942 |
| 2,445,325 | Hemp | July 20, 1948 |
| 2,549,404 | Williams | Apr. 17, 1951 |
| 2,670,869 | Martin | Mar. 2, 1954 |
| 2,672,999 | Protasoff | Mar. 23, 1954 |